United States Patent [19]
Gordon

[11] 3,944,235
[45] Mar. 16, 1976

[54] GASKET WITH HEAT INSULATING PROPERTIES

[75] Inventor: Alexander L. Gordon, Worcester, Mass.

[73] Assignee: Federal-Mogul Corporation, Southfield, Mich.

[22] Filed: Jan. 17, 1975

[21] Appl. No.: 542,078

Related U.S. Application Data

[63] Continuation of Ser. No. 358,293, May 8, 1973, abandoned.

[52] U.S. Cl. .................. 277/22; 277/227; 277/233; 428/444
[51] Int. Cl.² .......................................... F02F 11/00
[58] Field of Search ............ 277/22, 166, 215, 227, 277/233, 235 B, 229, 178, 199, 232; 156/335; 161/109, 110, 205, 257, 207

[56] References Cited
UNITED STATES PATENTS

| | | | |
|---|---|---|---|
| 854,234 | 5/1907 | Perry | 277/166 |
| 2,021,571 | 11/1935 | Victor et al | 277/233 |
| 2,072,862 | 3/1937 | Balfe | 277/22 |
| 3,114,669 | 12/1963 | Herbst | 161/205 |

OTHER PUBLICATIONS

Vol. 49, Aug. 1963, 8th Edition of *Lubrication;* published by Texico Inc. (see p. 120).

*Primary Examiner*—Richard E. Aegerter
*Assistant Examiner*—Willis Little
*Attorney, Agent, or Firm*—Owen, Wickersham & Erickson

[57] ABSTRACT

A gasket with heat-insulating properties is provided for such uses as for mounting a carburetor on an internal-combustion-engine casting. A thick core of heat-insulating resin, such as phenolic resin, is sandwiched between two thin cutout sheets of resilient gasket material. The core provides the heat insulation, and the gasket material provides the resilience needed to assure sealing on rough surfaces. Heat-dissipating fins or the like may also be provided, as well as rings of heat-insulating material which can surround the bolts used to hold the carburetor in place. The core is molded to shape, while the gasket material may be cut out to shape and secured to it by a thermo-setting resin, such as a nitrile-rubber-phenolic-resin material.

10 Claims, 6 Drawing Figures

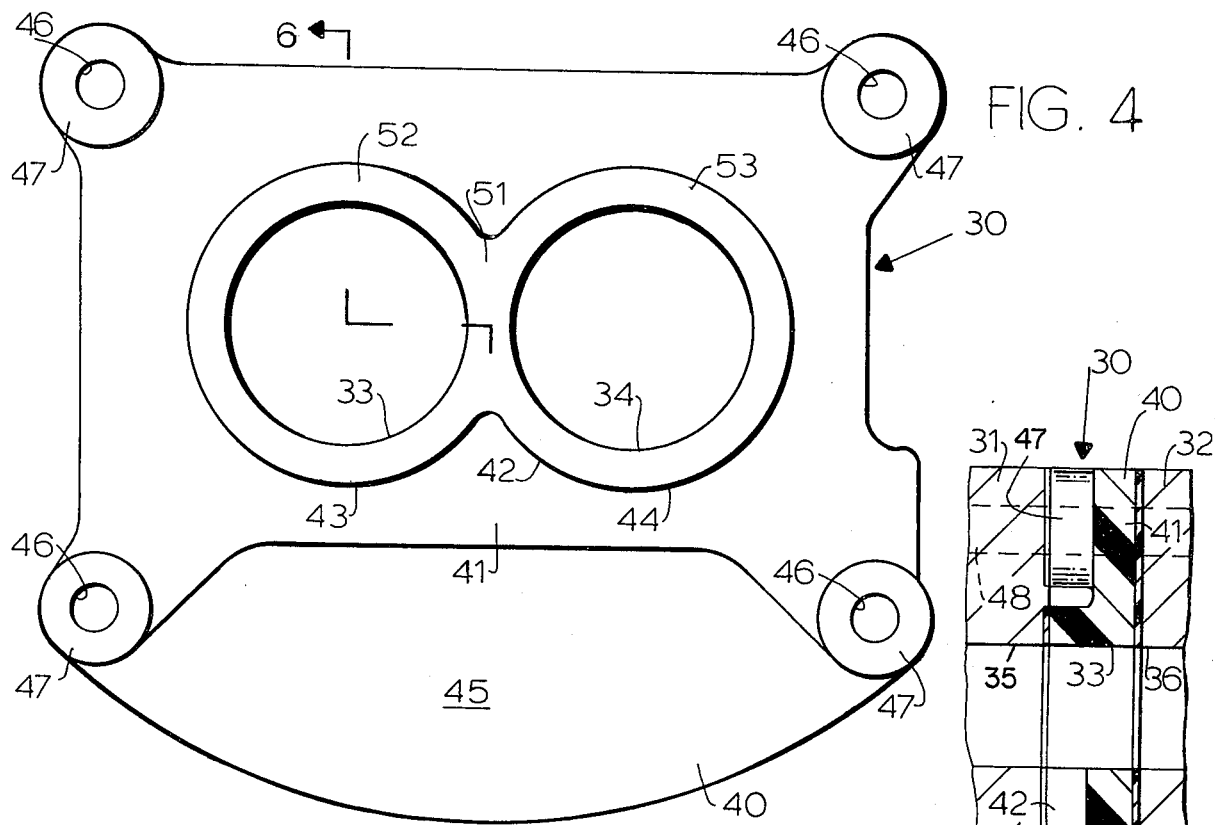
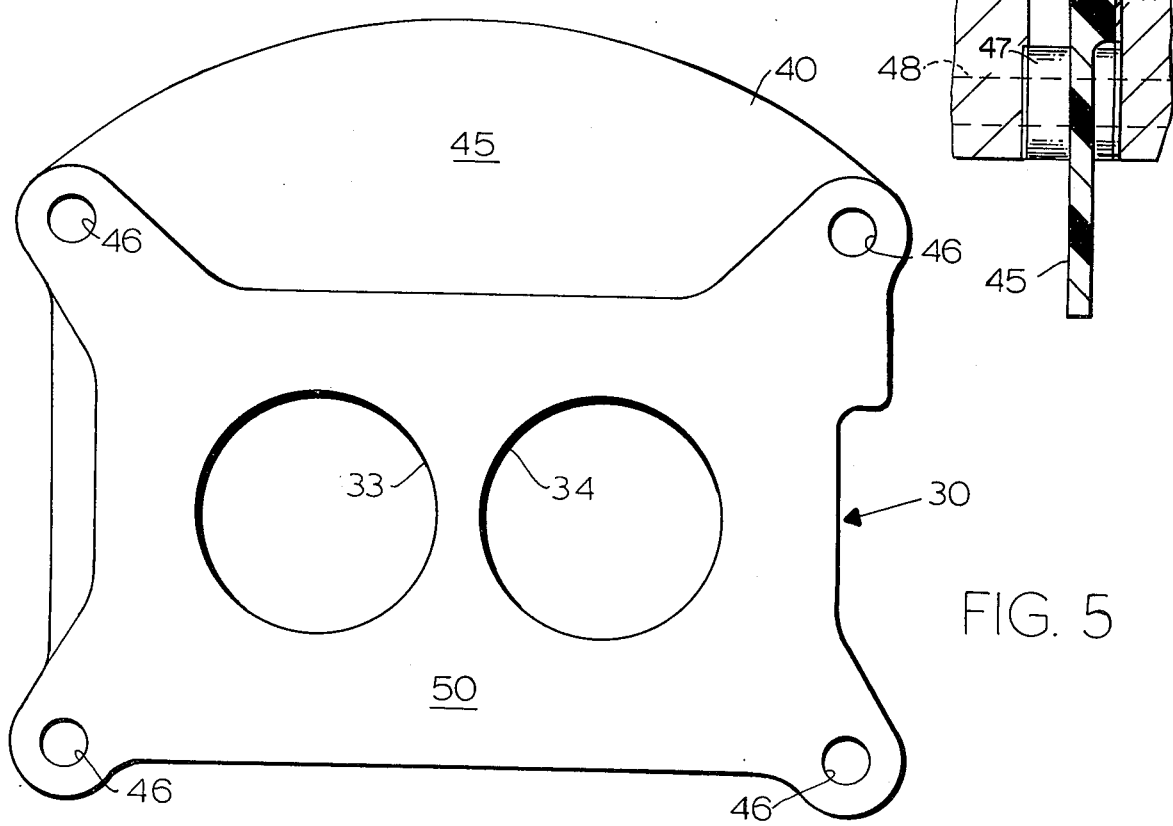

GASKET WITH HEAT INSULATING PROPERTIES

REFERENCE TO RELATED APPLICATION

This application is a continuation of application Ser. No. 358,293, filed May, 8, 1973, now abandoned.

BACKGROUND OF THE INVENTION

This invention relates to a novel gasket having significant heat-insulating properties.

While the gasket can be used in many environments, one which gave rise to a serious problem solved by this invention, will serve as an example. This is the gasket used in automobile engines between the carburetor and the manifold, in other words, the gasket used between the carburetor and the engine casting, to which the carburetor is mounted by bolts. Heretofore, a fiber gasket about 1/32nd to 1/16th inch thick or a metal inserted asbestos gasket has been used, its function being to seal, so that the fuel — gasoline, gasoline vapor, and mixture of gasoline and air — could not escape to the atmosphere through this connection, nor could air from the atmosphere be drawn in through the connection. Such fiber gaskets were able to provide little thermal insulation. This factor was given little consideration until recently, but now it is recognized that such insulation is necessary to reduce fuel bowl temperatures, and it was found that problems were being caused by the passage of heat from the engine manifold at the engine casting to the carburetor, and that this heat transfer was affecting the operation of the carburetor by raising the temperature of the fuel bowl to an excessive temperature.

The initial attempt to solve this problem comprised using thicker gaskets, frequently about one-fourth inch thick, sometimes even thicker, in an attempt to provide some thermal insulation. However, this had difficulties too in achieving accurate control of thickness and other dimensions which are necessary for good sealing performance, and for uniform distribution of compressive loads over the entire flange surface.

Other attempts combined in laminar form resin-impregnated vegetable fiberboard and elastomeric sheets.

As indicated above, it is important to provide a gasket having better heat-insulation properties. It is also important to provide a more uniform distribution of the compressive loads over the entire surface of the flange. It has also been important to provide more accurate control of the thickness and other dimensions which contribute to sealing performance. Also, there have been problems in taking care of various three-dimensional configurations, because the gaskets have heretofore been cut from a sheet of constant thickness; while this has been a generally economical method for making gaskets, it gave no three-dimensional control or configuration at all.

SUMMARY OF THE INVENTION

The desirable features just mentioned and the solution to the problems described just previously are obtained by providing a composite gasket comprising a thick molded core of heat-insulating phenolic resin molded to desired shape and sandwiched between and cemented to a pair of thin cutout sheets of resilient gasket material such as a nitrile rubber and asbestos composition. As a result, it has been possible to provide considerable thickness, up to a quarter of an inch and more, if desired, to enable heat insulation while minimizing the amount of gasket material in the thin sheets. But further than this, the combination offers both better heat resistance and a more uniform distribution of the compressive loads which are distributed over the entire flange surface. Still further, the thickness has been more accurately controlled than could be with conventional thick gasket material, while other dimensions have been controlled too by the molding process so that there is better over-all sealing performance. The resin material is substantially rigid and does not compress; all the compressing is taken care of by the thin gasket material of the outer skin of the composite gasket.

Since the core is molded, it is possible to incorporate three-dimensional configurations, providing thicker portions and thinner portions where desired. For example, one or more fins may be provided to help dissipate or deflect heat, and these can be thinner than the main core and can project out from the gasket into the air. Also, special bolt-encircling portions may be provided to fit in recesses and prevent heat from being conducted to and through the bolt. It is possible to produce a core of any desired thickness and any configuration.

BRIEF DESCRIPTION OF THE DRAWINGS

In the drawings:

FIG. 4 is a top plan view of a modified form of carburetor gasket in which various thicknesses are provided.

FIG. 5 is a bottom view of the gasket of FIG. 4.

FIG. 6 is a view in section taken along the line 6—6 in FIG. 4 and shown installed in place.

DETAILED DESCRIPTION OF SOME PREFERRED EMBODIMENTS

Figure 1:
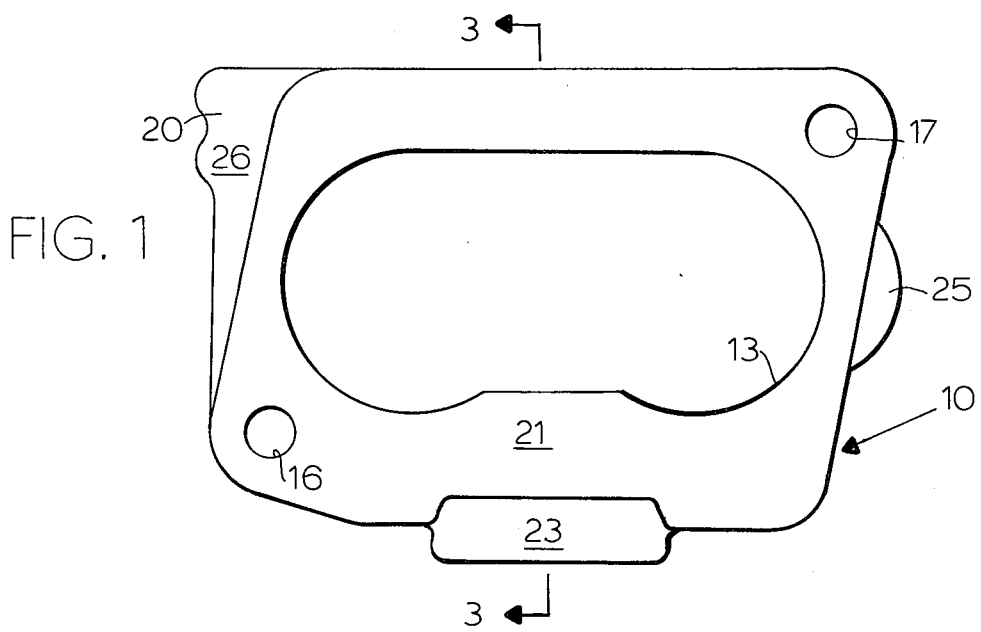
FIG. 1 is a top plan view of a gasket embodying the principles of the invention.
Figure 3:
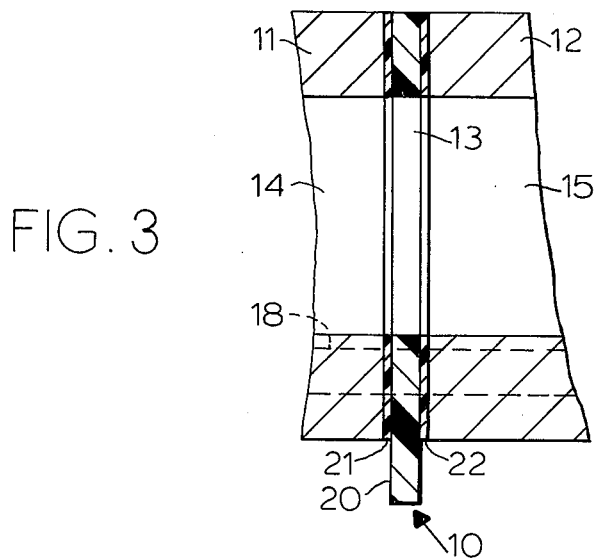
FIG. 3 is a view in section of the gasket of FIG. 1 taken along the line 3—3 in FIG. 1, shown in place between two metal members in an installation between the carburetor and the engine casting.
Figure 2:
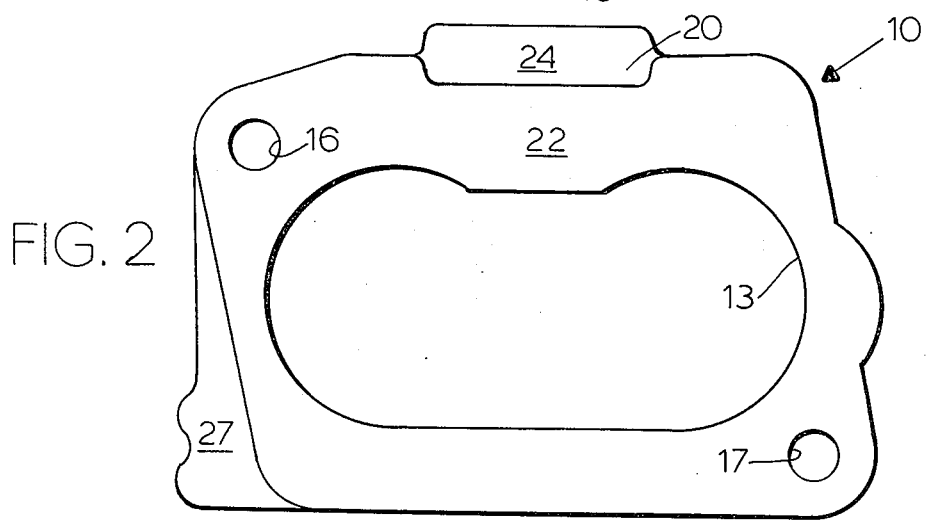
FIG. 2 is a bottom view of the same.

A gasket 10 shown in FIGS. 1 to 3 exemplifies a simple form of the invention. The gasket 10 is provided with a desired shape to fit, as shown in FIG. 3, between a carburetor housing 11 and an engine manifold portion 12 of an engine casting. The gasket 10 is provided with a large central opening 13 of an elongated, somewhat oval shape, for the passage between the carburetor 11 and the manifold 12, being aligned with their respective passages 14 and 15. The gasket 10 is also provided with a pair of bolt openings 16 and 17, for bolts 18.

As shown in section in FIG. 2, the gasket 10 includes a central core 20 which is molded to shape and comprises the bulk of the thickness, for example, in a gasket 10 having a total thickness of about 0.240 inch, the core 20 may be about 0.204 to 0.206 thick. This core 20 is preferably phenolformaldehyde resin filled with a mineral type of filler, such as asbestos, fuller's earth, clay, etc., or with a type of high temperature glass for especially high-temperature installations. Other thermosetting resins may be used, such as silicone resins, alkyd resins, and poly (amide-imide) resins.

A phenolic core 20 has the following typical properties:

| | |
|---|---|
| Tensile Strength - ASTM D 638 | 7,500 psi. |
| Compressive Strength - ASTM D 695 | 32,000 psi. |
| Flexural Strength - ASTM D 790 | 15,000 psi. |
| Impact, Izod - ASTM D 256 | 0.26 ft. lbs. per in. |
| Deflection Temperature at 264 psi. - ASTM D 648 | 360°F. |
| Modulus in tension - ASTM D 638 | $1.4 \times 10^6$ psi. |
| Values based on tests conducted at 23°C. after conditioning specimens 48 hrs. at 50°C. | |
| Thermal Conductivity | $11.8 \times 10^{-4}$ cal. gram (15°C.0/(Sec.) (cm.$^2$) (°C/cm.) 3.42 btu (mean)/(hr.) (ft$^2$) (°F/inch) |
| Water Absorption - ASTM D 570 | 0.35% |

The upper temperature limit of the phenolic core 20 is about 500°F., as compared with a limit of about 300°F. for fiberboard.

Each bearing surface of the core 20 is covered with a suitable skin 21 or 22 of gasket material. Non-bearing surfaces 23, 24, 25, 26, and 27 of the core 20 are not covered, because they are not seating surfaces. For example, in a 0.24 inch thick gasket 10 each facing 21,22 may be 0.014 to 0.017 thick on each side, so that these are relatively thin gasket skins. They may be made from compositions such as a mixture of nitrile elastomer and asbestos materials. Other typical kinds of materials thay may be used are compositions of styrene elastomer and asbestos, polychloroprene elastomer and asbestos, and blends of the named polymers and asbestos. Any of these may be produced by the beater addition process or by the sheeter process (compressed asbestos).

The skins 21 and 22 may be bonded to the core by a thermosetting adhesive, such as a mixture of nitrile rubber and phenolic resin.

The skins 21 and 22 may be composed of nitrile (Buna N) rubber and asbestos fiber, produced by the beater addition process so as to be highly uniform, and then formed into sheets and blanked out to shape. This composition has both excellent heat resistance and excellent resistance to petroleum fuels, lubricants, water, and other liquids encountered. It can be used at temperatures up to 500°F.

| Typical material specifications are: | |
|---|---|
| Compressibility | |
| 5000 psi. load, % | 15–25 |
| Recovery, minimum % | 40 |
| Tensile Strength | |
| Longitudinal, minimum psi. | 3,000 |
| Transverse, minimum psi. | 2,000 |
| Fluid Immersion | |
| ASTM Oil No. 3–5 hours at 300°F. | |
| Compressibility, maximum % | 30 |
| Loss in Tensile Strength, maximum% | 35 |
| Thickness Increase, % | 5–15 |
| ASTM Ref. Fuel B--5 hours at 70–80°F. | |
| Weight Increase, maximum % | 30 |
| Thickness Increase, % | 5–15 |

Test procedures are according to ASTM F104.

The skins 21 and 22 should have sufficient heat resistance to be able to stand the temperature environment but are not relied upon primarily for insulation but for their ability to seal and to provide sufficient resilience. Since they are thin, they do not transmit their resilience to changes in shape elsewhere to any excessive degree and therefore can be well relied upon to give accurate thicknesses and not to affect the accuracy of thickness of the composite gasket 10. Similarly, the combination of the core 20 with the skins 21 and 22 uniformly distributes the compressive loads over the entire flange surface instead of allowing some portion to give more than others to a really substantial degree, yet there is enough conformability to enable the gasket 10 to take care of various environments and to accommodate the roughnesses of the surfaces between which the gasket 10 is being installed.

The installation is relatively simple, the carburetor 11 is bolted to the engine casting 12 at the manifold with the gasket 10 in between. The heat insulation is provided principally by the core 20, which also provides the rigidity noted previously, while the resilient gasket skins 21 and 22 take up the imperfections in the surfaces and enable accurate sealing.

FIGS. 4, 5 and 6, show a modified form of the invention in which a different form of gasket 30 is provided. The general shape of gaskets is not of great significance, since many automobile manufacturers and carburetor manufacturers have different shapes, matching the shapes of the carburetor flange 31 and the flange 32 of the engine casting. The gasket 30 has openings 33 and 34 corresponding to openings 35 in the carburetor housing and openings 36 in the engine casting (FIG. 6). What is more significant here is that the gasket 30 has a phenolic member 40 molded to provide different thicknesses. The member 40 has a main body 41 and a thick portion 42 engaging the carburetor flange 31. This portion 42 comprises two interlocked annular cylindrical portions 43 and 44. The member 40 also has a projection 45 extending outside the gasketing area and much thinner than the body 41. This portion 45 serves as a heat-dissipating and deflecting fin, to radiate some of the heat into the environment. Another significant feature is that at each bolt opening 46 the core 40 is thickened to provide a projection 47 which is cylindrical in shape. The projection 47 surrounds the bolt 48 and extends up into the recesses for the bolt in the members 31 and 32 and thereby aids in helping to prevent heat conduction from that source. The bottom surface of the gasket core 40 is faced by a facing 50 of gasket material and the opposite surface of the thick portion 42 is faced by a facing 51 of gasket material. The facing 51 includes only the two interlinked annuli 52 and 53.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A carburetor mounting gasket for interposition between a carburetor casting and an automobile engine casting, including in combination, a thick molded rigid core of heat-insulating resin having passage means therethrough, a first flat bearing surface for facing one said casting, an opposite flat non-bearing surface from which projects a portion surrounding said passage means, said portion having a second flat bearing surface for facing the other said casting, two thin cutout sheets of resilient gasket material, one covering each of said flat bearing surfaces and secured thereto, said core having rigid cylindrical extensions for surrounding bolts used to secure the carburetor casting to said engine casting, whereby gasket sealing is obtained while the carburetor is also insulated from the heat of said engine casting.

2. A carburetor mounting gasket for interposition between a carburetor casting and an automobile engine casting, including in combination,
 a thick molded core of heat-insulated resin having passage means therethrough, a first flat bearing surface for facing one said casting, an opposite flat non-bearing surface from which projects a portion surrounding said passage means, said portion having a second flat bearing surface for facing the other said casting,
 two thin cutout sheets of resilient gasket material, one covering each of said flat bearing surfaces and secured thereto,
 said core having at least one thinner heat-deflecting portion of said heat-insulating resin extending out laterally beyond said bearing surfaces, one surface of said heat-deflecting portion being generally coplanar with said non-bearing surface, its opposite surface being recessed from said first flat bearing surface.

3. The gasket of claim 2 wherein said core is made from filled phenol-formaldehyde resin.

4. The gasket of claim 2 wherein the gasket material of said cutout sheets is made from a blend of nitrile rubber and asbestos fiber.

5. A carburetor mounting gasket for interposition between a carburetor casting and an automobile engine casting, including in combination,
 a thick molded core of heat-insulating resin having passage means therethrough, a first flat bearing surface for facing one said casting, an opposite flat non-bearing surface from which projects a portion surrounding said passage means, said portion having a second flat bearing surface for facing the other said casting,
 two thin cutout sheets of resilient gasket material,
 said cutout sheets being secured to said core by a separate thermosetting adhesive.

6. The gasket of claim 5 wherein said adhesive is a blend of phenol-formaldehyde resin and nitrile rubber.

7. A carburetor mounting gasket for interposition between a carburetor and an automobile engine casting around a passage, including in combination,
 a thick molded core of heat-insulating thermosetting resin having main passage means therethrough for alignment with said passage, said core comprising a main body providing a flat base around said passage and a thicker portion immediately surrounding said passage means and having a flat bearing surface, said core also having bolt openings therethrough and thickened projections surrounding each said bolt opening, and
 two thin cutout sheets of resilient gasket material, one facing said flat base, the other facing said flat bearing surface,
 whereby gasket sealing is obtained while the carburetor is also insulated from the heat of said engine casting.

8. A carburetor mounting gasket for interposition between a carburetor and an automobile engine casting around a passage, including in combination,
 a thick molded core of heat-insulating filled phenol-formaldehyde resin having main passage means therethrough for alignment with said passage, said core comprising a main body providing a flat base around said passage and a thicker portion immediately surrounding said passage means and having a flat bearing surface, said core also having bolt openings therethrough and thickened projections surrounding each said bolt opening, and
 two thin cutout sheets of resilient gasket material comprising a blend of asbestos fibers and nitrile rubber, one facing said flat base, the other facing said flat bearing surface,
 whereby gasket sealing is obtained while the carburetor is also insulated from the heat of said engine casting.

9. The gasket of claim 8 wherein said sheets are adhered to said core by a separate thermosetting adhesive comprising a blend of phenol-formaldehyde resin and nitrile rubber.

10. A carburetor mounting gasket for interposition between a carburetor and an automobile engine casting, including in combination,
 a thick molded core of heat-insulating phenol-formaldehyde resin of substantially constant thickness having passage means therethrough, and bolt openings therethrough, a first flat surface for facing said engine casting, and surrounding said passage means and bolt openings, and an opposite flat surface for facing said carburetor and surrounding said passage means and said bolt openings,
 two thin cutout sheets of resilient nitrile rubber and asbestos fiber gasket material,
 said cutout sheets being heatedly secured to said core by a separate thermosetting adhesive comprising a blend of phenol-formaldehyde resin and nitrile rubber and each said cutout sheet providing a continuous flat surface surrounding said passage means and said bolt openings.

* * * * *